Patented Sept. 18, 1951

2,567,956

UNITED STATES PATENT OFFICE 2,567,956

HIGH-PRESSURE POLYMERIZATION OF PERHALOOLEFINS

William T. Miller, Ithaca, N. Y., assignor to the United States of America as represented by the United States Atomic Energy Commission No Drawing. Application February 25, 1948, Serial No. 10,912

16 Claims. (Cl. 260—92.1)

This invention relates to the production of high molecular weight polymers of completely halogenated olefins and more particularly to a process for the polymerization of olefins completely halogenated with fluorine or with fluorine and chlorine.

This application is a continuation-in-part of my copending application Serial Number 730,176, filed February 21, 1947.

The polymerization of completely halogenated olefins containing only carbon and fluorine, or only carbon, fluorine and chlorine, has been accomplished at pressures up to about 1,000 atmospheres. Such polymerizations are often carried out in the presence of promoters such as organic peroxides, oxygen or inorganic peroxides. In many cases one of the principal difficulties encountered at these pressures has been the long period of time, usually in excess of one or two days, necessary to achieve a satisfactory conversion to high molecular weight polymer. In an attempt to produce a commercially satisfactory product, efforts were made to increase the pressure in order to decrease the requisite polymerization time to less than 24 hours. However, it was found that at pressures of the order of 1,000 to about 7,500 kilograms per square centimeter, the polymerization product obtained without a promoter in 24 hours or less was generally unsatisfactory. Indeed, in most cases, the molecular weight of the product was so low that no solid was formed but instead liquid and grease-like polymers were obtained. For example, polymerization of hexafluorobutadiene at 65° C. for 24 hours yielded only a small amount of grease-like product.

Accordingly, this invention has as one of its objects the provision of a rapid process for the polymerization of completely halogenated olefins containing only carbon and fluorine, or only carbon, fluorine and chlorine.

Another object of this invention is to reduce the polymerization time for olefins of the type described and still to produce a commercially satisfactory solid polymer.

Still another object of the invention is to provide a process for producing very high molecular weight resilient polymers of perhalogenated olefins containing only carbon and fluorine or only carbon, fluorine and chlorine and having a high degree of chemical and thermal stability.

Other objects will appear hereinafter.

As has already been pointed out, the polymerization products obtained without a chemical promoter in less than 24 hours under pressures of less than 7,500 kilograms per square centimeter are often unsatisfactory with regard to their mechanical properties. I have found that the application of very high pressures of the order of 10,000 to 20,000 kilograms per square centimeter in polymerizations of completely halogenated olefins of the type described has yielded solid products in a considerably shorter period of time than has heretofore been possible. Indeed, exceptionally high molecular weight, resilient polymers of completely halogenated olefins substituted only with fluorine, or only with fluorine and chlorine, have been obtained in 24 hours or less and in most cases within 5 to 20 hours. These solid polymers have excellent mechanical properties which they retain up to a relatively high temperature. On the other hand, the polymerization of many monomers at pressures under 7,500 kilograms per square centimeter for periods of time up to 24 hours will yield products of relatively low molecular weight, as indicated by the liquid or greaselike form of the products. In accordance with this invention, even at the very high pressures involved, it may often be desirable to add a promoter deliberately, such as an organic peroxide, in order to improve the polymerization reaction still further. The benefits derived from the use of a promoter, in general, are an increased rate of reaction, an increased yield and a higher molecular weight product under properly selected conditions of polymerization.

When, at relatively low pressures, a promoter is employed in the polymerization of such compounds as trifluorochloroethylene or hexafluorobutadiene-1,3 it is necessary to regulate carefully the temperature of the polymerization at a value at which the properties of the promoter aid the polymerization. For example, in order to obtain the best possible results when organic peroxide promoters are used, the temperature of polymerization should be regulated carefully to control the rate of decomposition of the promoter. As a result, the useful range of temperatures is somewhat limited at ordinary pressures. On the other hand, the use of the very high pressures to which the present invention is directed makes it possible to extend the useful temperature range in which polymerization promoters may be employed.

The use of pressures in excess of 10,000 kilograms per square centimeter in the polymerization of trifluorochloroethylene for example yields a material having extremely high resistance to corrosion by most materials and an elasticity resembling that of rubber even when the polymer is heated almost to its decomposition point. This polymer of trifluorochloroethylene is resistant to attack under almost all conditions by acids, alkalis, reducing or oxidizing agents, halogens and so on, and in general is a remarkably inert substance. The high molecular weight polymers of hexafluorobutadiene prepared under pressures in excess of 10,000 kilograms per square centimeter also have very desirable properties, particularly with respect to their elasticity and thermal stability. The chemical stability of the hexafluorobutadiene polymer is not quite so high as that of the trifluorochloroethylene polymer since the former retains a double bond in each polymerization unit. However, relative to most plastics and rubber compositions the hexafluorobutadiene high molecular weight polymer is a very inert substance. It then becomes apparent that, by reason of their elasticity and their chemical and thermal stability, such polymers are widely useful in valve seats, gaskets, diaphragms, packing materials and the like where corrosive substances are being handled at temperatures where ordinary polymeric materials would be unsuitable.

The examples following hereinafter are presented to illustrate the method of the present invention and it is to be understood that they are not to be construed as a limitation of the invention.

The high pressure polymerizations described hereinafter were carried out in equipment described in "The Physics of High Pressures" by P. A. Bridgeman, published by the McMillan Company, New York, in 1931. The pressure cylinder employed had a useful volume of approximately 8 to 15 cubic centimeters and chloroprene rubber gaskets were used to seal the pistons. In cases where a solid peroxide promoter was added the pressure cylinder was rotated in a lathe. A steel ball was usually included in the rotated pressure cylinder to insure complete mixing. The temperatures of the pressure cylinders were maintained substantially constant during those periods when pressure was applied.

Example 1

Approximately 15 cubic centimeters of hexafluorobutadiene were polymerized for 18 hours at 63° C. under a pressure of 16,000 kilograms per square centimeter. The solid product obtained was heated slowly without visible change through a temperature of 100° C. This material could be easily spread by pressing at a temperature of about 275° C., but still had a rubbery elasticity at about 300° C. at which point there was no visible melting, although the sample had softened considerably.

Example 2

Fifteen cubic centimeters of hexafluorobutadiene were polymerized for 24 hours at a temperature of 65° C. in the presence of 0.1% benzoyl peroxide by weight based on the monomer. The applied pressure was approximately 15,000 kilograms per square centimeter and approximately 83% by weight of the starting material was converted to the solid. On heating, the solid product showed signs of decomposition at a temperature of about 260° C. but retained a rubber-like elasticity at a temperature of at least 300° C., at which point the sample was quite soft.

Example 3

Hexafluorobutadiene was polymerized under a pressure of 20,000 kilograms per square centimeter for 24 hours at room temperature. The solid polymer on heating was capable of being spread under manual pressure at about 275° C. and was quite elastic up to 300° C. at which point it was not yet melted.

Example 4

Trifluorochloroethylene was polymerized at room temperature for 21 hours under a pressure of 16,000 kilograms per square centimeter. The solid translucent polymer obtained was heated on a hot plate. At 200° C. the polymer was roughly as elastic as natural rubber and it retained its elasticity up to about 265° C. where it still recovered fully after deformation although it was quite soft. At about 270 to 275° C. the polymer was permanently deformed on stretching.

Example 5

Trifluorochloroethylene was polymerized in the presence of 0.1% of boron trifluoride-dimethyl ether complex, $[(CH_3)_2O].BF_3$, at room temperature under a pressure of 17,000 kilograms per square centimeter. A dark translucent somewhat elastic solid was produced with essentially complete conversion of the monomer.

The following examples are indicative of the results obtained under various conditions. In each case about eleven cubic centimeters of the monomer were polymerized under the described conditions.

| Example No. | Monomer | Promoter | Duration of Application of Pressure | Pressure, kg./cm² | Temp., °C. | Yield of Solid Product |
|---|---|---|---|---|---|---|
| 6 | $C_4F_6$ | None | 24 hours | 15,000 | 50 | 2.5 gms. |
| 7 | $C_4F_6$ | None | 23 hours | 15,000 | 25 | 1.95 gms. |
| 8 | $C_4F_6$ | None | 9 days | 15,000 | 22–24 | 6.39 gms. |
| 9 | $C_4F_6$ | 0.1 g. Benzoyl Peroxide | 23 hours | 15,000 | 22 | 1.98 gms. |
| 10 | $C_4F_6$ | do | do | 20,000 | room temp. | 5.22 gms. |
| 11 | $C_2F_3Cl$ | None | 21 hours | 16,000 | room temp. | 100% conversion. |
| 12 | $C_2F_3Cl$ | 0.1% Benzoyl Peroxide | 4.5 hours | 16,000 | 60 | Do. |

At a pressure of 15,000 kilograms per square centimeter at 60° C., approximate measurement of the reduction in volume of the reaction mixture indicated that the greatest proportion of the monomer was converted in the first five hours. After that length of time, the rate of increase in yield was relatively small.

The application of pressures lower than about 10,000 kilograms per square centimeter results in partial conversion of the liquid monomer to the solid polymer, the yields of the reactions increasing with time at a somewhat higher rate than at relatively low pressures of the order of 1000 atmospheres and less. However, there is a marked improvement in the rate of polymerization and the yields obtained at applied pressures of about 10,000 kilograms per square centimeter and above. The preferred operating range is approximately 10,000 to 20,000 kilograms per square centimeter while especially improved results have been obtained at about 15,000 to 16,000 kilograms per square centimeter.

The present invention is particularly valuable in preparing very high molecular weight polymers of hexafluorobutadiene.

Although it is preferred to operate in the range of about room temperature to 70° C., in cases where a peroxide polymerization promoter is used, it is advantageous to maintain the temperature at a point where a useful rate of decomposition of the peroxide takes place. Although the embodiments have been described with reference to trifluorochloroethylene and hexafluorobutadiene it will be understood that the method is also applicable to other members of the class of olefins completely halogenated with only fluorine or with only fluorine and chlorine, for example, asymmetrical difluorodichloroethylene and completely substituted fluorochlorobutadienes, and to mixtures of members of this class to prepare copolymers.

Other alternatives will be apparent to those skilled in the art.

Since many embodiments might be made of the present invention and since many changes might be made in the embodiment described, it is to be understood that the foregoing description is to be interpreted as illustrative only and not in a limiting sense.

I claim:

1. A method of preparing a high molecular weight polymer of a compound of 2 to 4 carbon atoms selected from the group consisting of olefinic compounds of carbon and fluorine and olefinic compounds of carbon, fluorine and chlorine which comprises subjecting said compound to a pressure in the range of 10,000 to 20,000 kilograms per square centimeter.

2. A method of preparing a high molecular weight polymer of a compound of 2 to 4 carbon atoms selected from the group consisting of olefinic compounds of carbon and fluorine and olefinic compounds of carbon, fluorine and chlorine which comprises subjecting said compound to a pressure in the range of 10,000 to 20,000 kilograms per square centimeter at a temperature in the range of from room temperature to 70° C.

3. A method of preparing a high molecular weight polymer of a compound of 2 to 4 carbon atoms selected from the group consisting of olefinic compounds of carbon and fluorine and olefinic compounds of carbon, fluorine and chlorine which comprises subjecting said compound to a pressure in the range of 10,000 to 20,000 kilograms per square centimeter in the presence of a polymerization promoter selected from the group consisting of benzoyl peroxide and a boron trifluoride-dimethyl ether complex.

4. A method of preparing a high molecular weight polymer of a compound of 2 to 4 carbon atoms selected from the group consisting of olefinic compounds of carbon and fluorine and olefinic compounds of carbon, fluorine and chlorine which comprises subjecting said compound to a pressure in the range of from 15,000 to 16,000 kilograms per square centimeter.

5. A method of preparing a high molecular weight polymer of hexafluorobutadiene which comprises subjecting the hexafluorobutadiene to a pressure in the range of from 10,000 to 20,000 kilograms per square centimeter.

6. A method of preparing a high molecular weight polymer of hexafluorobutadiene which comprises subjecting the hexafluorobutadiene to a pressure in the range of from 10,000 to 20,000 kilograms per square centimeter in the presence of a polymerization promoter selected from the group consisting of benzoyl peroxide and a boron trifluoride-dimethyl ether complex.

7. A method of preparing a high molecular weight polymer of hexafluorobutadiene which comprises subjecting the hexafluorobutadiene to a pressure in the range of from 10,000 to 20,000 kilograms per square centimeter at a temperature in the range of from room temperature to 70° C.

8. A method of preparing a high molecular weight polymer of hexafluorobutadiene which comprises subjecting the hexafluorobutadiene to a pressure in the range of from 10,000 to 20,000 kilograms per square centimeter in the presence of benzoyl peroxide.

9. A method of preparing a high molecular weight polymer of trifluorochloroethylene which comprises subjecting the trifluorochloroethylene to a pressure in the range of from 10,000 to 20,000 kilograms per square centimeter.

10. A method of preparing a high molecular weight polymer of trifluorochloroethylene which comprises subjecting the trifluorochloroethylene to a pressure in the range of from 10,000 to 20,000 kilograms per square centimeter at a temperature in the range of from room temperature to 70° C. in the presence of a polymerization promoter selected from the group consisting of benzoyl peroxide and a boron trifluoride-dimethyl ether complex.

11. A method of preparing a high molecular weight polymer of trifluorochloroethylene which comprises subjecting the trifluorochloroethylene to a pressure in the range of from 10,000 to 20,000 kilograms per square centimeter in the presence of dimethyl ether-boron trifluoride complex.

12. A method of preparing a high molecular weight polymer of trifluorochloroethylene which comprises subjecting the trifluorochloroethylene to a pressure in the range of from 10,000 to 20,000 kilograms per square centimeter in the presence of benzoyl peroxide.

13. A method for preparing a high molecular weight polymer which comprises subjecting at least one compound of 2 to 4 carbon atoms selected from the group consisting of olefinic compounds consisting of carbon and fluorine and olefinic compounds consisting of carbon, fluorine and chlorine to a pressure of at least 10,000 kilograms per square centimeter.

14. A method for preparing a high molecular weight polymer which comprises subjecting at least one compound of 2 to 4 carbon atoms selected from the group consisting of olefinic compounds consisting of carbon and fluorine and olefinic compounds consisting of carbon, fluorine and chlorine to a pressure of at least 10,000 kilograms per square centimeter in the presence of an organic peroxide as a promoter.

15. A method for preparing a high molecular weight polymer of trifluorochloroethylene which comprises subjecting trifluorochloroethylene to a pressure of at least 10,000 kilograms per square centimeter.

16. A method for preparing a high molecular weight polymer which comprises subjecting a conjugated perhalogenated fluorochlorobutadiene to a pressure of at least 10,000 kilograms per square centimeter.

WILLIAM T. MILLER.

No references cited.